US012682733B2

(12) United States Patent
Hachmann

(10) Patent No.: US 12,682,733 B2
(45) Date of Patent: Jul. 14, 2026

(54) GOODS PRESENTATION SYSTEM AND METHOD

(71) Applicant: INVENTORY SYSTEMS GMBH, Berlin (DE)

(72) Inventor: Georg Hachmann, Berlin (DE)

(73) Assignee: INVENTORY SYSTEMS GMBH, Berlin (DE)

( * ) Notice: Subject to any disclaimer, the term of this patent is extended or adjusted under 35 U.S.C. 154(b) by 309 days.

(21) Appl. No.: 18/208,733

(22) Filed: Jun. 12, 2023

(65) Prior Publication Data

US 2024/0404382 A1 Dec. 5, 2024

Related U.S. Application Data

(60) Provisional application No. 63/470,607, filed on Jun. 2, 2023.

(51) Int. Cl.
*G08B 13/22* (2006.01)
*A47F 5/00* (2006.01)

(52) U.S. Cl.
CPC ............ *G08B 13/22* (2013.01); *A47F 5/0018* (2013.01); *A47F 2005/0075* (2013.01)

(58) Field of Classification Search
None
See application file for complete search history.

(56) References Cited

U.S. PATENT DOCUMENTS 7,768,399 B2 * 8/2010 Hachmann ............ A47F 5/0861 340/568.1
10,760,947 B1 * 9/2020 Gyori ..................... G01G 19/42
11,514,766 B1 * 11/2022 McDaniel .......... G08B 13/1472
11,540,628 B2 1/2023 Brück et al.
2004/0073334 A1 * 4/2004 Terranova ............... G07F 9/026 700/236
2009/0234839 A1 * 9/2009 Angell ................... G06Q 10/04 707/999.005
2012/0218109 A1 * 8/2012 Tatsumi ............. G08B 13/1454 340/568.8

(Continued)

FOREIGN PATENT DOCUMENTS

DE 202004005743 U1 * 8/2005 .............. G07F 11/42
EP 3039624 B1 7/2016
WO 2019025558 A1 2/2019

OTHER PUBLICATIONS

Partial International Search Report dated Sep. 25, 2024 in application PCT/EP2024/065102.

*Primary Examiner* — Muhammad Adnan
(74) *Attorney, Agent, or Firm* — Maschoff Brennan

(57) ABSTRACT

A goods presentation system including at least one goods presentation assembly defining at least two different rows for presenting goods, wherein goods are to be removed one after another from each row. The system also includes a detection member for the at least one goods presentation assembly configured to be contacted upon a removal of at least one good from a first row of the least two rows and to be also contacted upon a removal of at least one good from at least one second row of the least two rows. At least one sensor element is associated with the detection member and configured to trigger generation of at least one electronic detection signal upon the detection member being contacted when a good is removed from one of the first and second rows.

19 Claims, 5 Drawing Sheets

(56) References Cited

U.S. PATENT DOCUMENTS

| | | | | |
|---|---|---|---|---|
| 2016/0055447 | A1* | 2/2016 | Sehmer | A47F 5/137<br>235/385 |
| 2016/0058205 | A1* | 3/2016 | Da Silva | A47F 1/12<br>221/92 |
| 2016/0086460 | A1* | 3/2016 | King | G08B 13/1436<br>340/572.1 |
| 2016/0286983 | A1* | 10/2016 | Hachmann | A47F 1/125 |
| 2018/0165626 | A1* | 6/2018 | Davidson | G06Q 10/08 |
| 2018/0271281 | A1* | 9/2018 | Bryan | A47B 57/06 |
| 2019/0038046 | A1* | 2/2019 | Hachmann | A47F 5/0823 |
| 2019/0147395 | A1* | 5/2019 | Wittig | A47B 96/021<br>705/28 |
| 2019/0282001 | A1* | 9/2019 | Deng | A47F 5/0018 |
| 2019/0346255 | A1* | 11/2019 | Liu | G06Q 10/08 |
| 2020/0060435 | A1* | 2/2020 | Everett | A47F 5/0018 |
| 2020/0275775 | A1* | 9/2020 | Marriott | A47F 10/02 |
| 2024/0265789 | A1* | 8/2024 | Zalewski | H04W 76/10 |

* cited by examiner

GOODS PRESENTATION SYSTEM AND METHOD

FIELD

The present invention relates to a goods presentation system, in particular for presenting goods at a point of sale.

BACKGROUND

Goods presentation systems including goods presentation assemblies with hooks for hanging goods or shelves for carrying goods at a point of sale are well-known. Typically, a display rack is provided at which such hooks and/or shelves are mounted. The goods, such as blister packs, bottles, or packages, hang or stand in rows side-by-side, in each row the same goods are arranged one behind the other.

Hanging goods may be slid along at least one elongated hook to a removal position at an end of the hook where goods may be removed from the hook. Usually, rather expensive goods like razor blades or cosmetic products are displayed at a point of sale by means of hooks. Those products shall be easily removable from a hook by a potential buyer. Furthermore, refilling the hooks with new goods shall also be rather simple. The same holds true for goods and thus products standing in rows on a shelf at a point of sale.

However, in practice such goods presentation systems are extremely prone to shoplifters since a great amount of expensive goods may be easily taken at the same time. In applicant's U.S. Pat. No. 7,768,399 a holder assembly is thus proposed which automatically determines a removal frequency at which goods are removed from a holding member. In case the determined removal frequency exceeds a threshold value an alarm signal is automatically emitted in order to indicate that an atypical removal of goods has occurred, i.e., a removal of many goods over a rather short period of time, which usually is a sign of a shoplifter grabbing several goods from the holder assembly. It is thus typical for an illicit removal that a large number of goods are taken from the holder assembly over a short period of time.

In the solutions proposed in the prior art detection electronics for determining a removal frequency typically measure a displacement of a single barrier element which is arranged at one hook for the goods in such a way that a good to be removed has to pass the barrier element and to thereby displace it. An example of such a barrier element in U.S. Pat. No. 7,768,399 is a swinging arm which may be displaced from a blocking position to a removal position for allowing one good at a time to be removed from a hook-shaped or rod-like elongated holding member.

Although the solution proposed in U.S. Pat. No. 7,768,399 provides for an effective anti-theft protection, it is not regularly used for all types of products. Often, such an individual electronic anti-theft solution is considered too expensive and too complicated to install.

SUMMARY

Against this background a goods presentation system is proposed which comprises at least one goods presentation assembly defining at least two rows for presenting goods, wherein goods are to be removed one after another from each row. The proposed goods presentation system further comprises a detection member for the at least one goods presentation assembly configured to be contacted upon a removal of at least one good from a first row of the at least two rows and to be also contacted upon a removal of at least one good from at least one second row of the at least two rows. At least one sensor element of the goods presentation system is associated with the detection member and configured to trigger generation of at least one electronic detection signal upon the detection member being contacted when a good is removed from one of the first and second rows. The at least one goods presentation assembly thus defines at least two rows for presenting goods, for example two rows at which the goods are respectively hung one behind the other or at which goods stand one behind the other. A single detection member is associated with at least two rows of goods. This detection member being monitored by at least one sensor element provides for detecting a removal of goods arranged in at least two different rows of goods at the goods presentation assembly. Upon the detection member being contacted, e.g., by the good to be removed or by a hand of a user removing a good from one of the rows, a detection signal is generated.

In one embodiment, the detection member may be associated with more than two, for example 3, 5, 8 or 10 rows of goods. By just providing a single detection member for a plurality of rows of goods (two or more rows of goods) costs and installation complexity may be significantly reduced compared to known prior art systems. Also, a single sensor element may be sufficient to monitor the single detection member which is associated with several rows of goods.

The at least one electronic detection signal may trigger output of at least one of an audible tone and a visual notification at the goods presentation system. Accordingly, upon the detection member being contacted by good which is to be removed from the goods presentation assembly (e.g., by a potential buyer/customer) an audible tone and/or visual notification at the goods presentation assembly is emitted. A corresponding audible and/or visible indication, for example, makes other customers or staff at a point of sale aware of a good taken from the goods presentation assembly. An audible tone may for example be output from a sound emitting device, such as a speaker, of the goods presentation system. A visual notification may be output via a light emitting element or display element at the goods presentation system.

In one embodiment, the goods presentation system comprises an alarm device configured to receive the at least one electronic detection signal and to detect the occurrence of a number of electronic detection signals during a given period of time exceeding a threshold value. The alarm device may thus for example be configures to automatically determine a removal frequency at which goods are removed. In case the determined removal frequency exceeds the threshold value and action may be triggered by the alarm device, such as generating an alarm signal. The alarm device may be configured to determine an atypical removal frequency of goods for generating the alarm signal. The alarm device may thus be configured to generate an alarm signal if a number of electronic detection signals during a given period of time exceeds the threshold value. The threshold value may for example be 3 detection signals in 5 seconds, 5 detection signals in 20 seconds, 7 detection signals in 30 seconds or 10 detection signals in 45 seconds.

In one embodiment, the alarm device may be configured to transmit the alarm signal to a mobile device. Such a mobile device may be a mobile phone or a pager to inform a staff person of the occurrence of an atypical removal of goods at the goods presentation assembly.

In addition or in the alternative, the alarm device may be configured to transmit the alarm signal to a surveillance system connected to the goods presentation system. A surveillance system may be connected to the surveillance system wirelessly or via a wired connection. The surveillance system may comprise at least one camera to capture images of the goods presentation assembly in response to receipt of the alarm signal. In one embodiment, the surveillance system comprises at least one robot to be controlled to move to the goods presentation assembly in response to receipt of the alarm signal.

In one embodiment, the surveillance system is configured to output at least one of an audible tone and a visual notification at a display device of the surveillance system. In addition or in the alternative, the surveillance system may forward the alarm signal to a mobile device in response to the receipt of the alarm signal. Compared to the environment mentioned above, the surveillance system thus decides on and finally transmits an alarm signal to a mobile device, whereas in the above mentioned embodiment, the goods presentation assembly directly transmits the alarm signal to a mobile device. By being connected to a surveillance system, the surveillance system may be configured to centrally control and transmit alarms for a plurality of goods presentation assemblies.

It is to be noted that detection of an atypical removal frequency is by no means mandatory for the proposed solution. In one embodiment, each contact of a removed good results in generation of at least one electronic detection signal triggering emission of an audible tone and/or visual indication at the goods presentation assembly. Studies show that already such a rather simple feedback on each removal of a good at a point of sale significantly reduces the likelihood of theft events.

In one embodiment, the at least one sensor element comprises a motion sensor for detecting movement of the detection member upon a contact of with the detection member. The motion sensor may, for example, be disposed at a portion of the detection member in order to sense when a good (which is removed from one of the first and second rows, or one of the further rows with which the single detection member is associated with) contacts the detection member or when a hand of consumer grabbing and removing the good contacts the detection member. The detection member may be dimensioned and arranged at the goods presentation assembly such that a removal of a good from an associated row is impossible or almost impossible without at least slightly contacting the detection member and thereby causing at least a slight (with an amplitude of less than 2 mm or less than 3 mm) swinging of a portion the detection member. The detection member may thus be dimensioned and arranged at the goods presentation assembly so that a good cannot be removed from one of the associated rows without at least causing a mechanical impulse on the detection member due to which the detection member vibrates. The motion sensor may then detect a corresponding vibration of the detection member. In one embodiment, the motion sensor may thus be configured to detect a vibration of the detection member resulting from a contact of a removed good with the detection member and to trigger generation of the at least one electronic detection signal based on the detected vibration.

In one embodiment, the detection member comprises a detection shield mounted at the front side of the at least two rows. A corresponding detection shield may be an elongated piece arranged at the front side of the at least two rows forming a mechanical barrier passed or over which a good has to be moved in order to be completely removed from the goods presentation assembly. In another embodiment, the detection shield covers at least a part of a front portion of the goods presentation assembly and forms a mechanical barrier which will be contacted upon a removal of a foremost good of a row of goods.

Generally, a detection shield may carry one or more price tags.

Being associated with two or more rows of goods and in particular rows for different goods, a detection shield may also carry several different price tags relating to the different goods and informing consumers of the different prices.

In one embodiment, the detection shield is an extruded part made of plastic material.

In one embodiment, the detection member includes a portion to be contacted upon a removal of a good from the first row and upon removal of a good from the at least one second row, wherein the portion is capable of vibrating and thus performing a swinging—back and forth—movement with a small amplitude (e.g., of less than 4 mm, 3 mm or 2 mm) upon being contacted.

In one embodiment, the goods presentation assembly comprises a first hook for the first row and a second hook for the second row. The first and second hooks may be respectively configured to hang goods one behind the other on them so that only a foremost good of a row of goods may be removed from the respective book at a front end of the hook. A detection member associated with two or more hooks may be then excited to vibrate in order to detect a removal of a good from the two or more hooks.

A first or second hook may, for example, be a wire hook.

The detection member may, for example, be clipped on a component of the goods presentation assembly. For example, the detection member may be clipped onto first and second hooks. A connection of the detection member by one or more clips may further facilitate mounting the detection member.

In one embodiment, the goods presentation assembly comprises a shelf in which the first row of goods and the at least one second row of goods are to be arranged. For example, the shelf includes at least two compartments, wherein each compartment defines one of the at least two rows for the goods to be presented and arranged at the goods presentation assembly. However, different compartments are not mandatory. The shelf may also just define a plane surface at which different rows of goods are to be arranged side-by-side. A single detection member monitored by at least one sensor element for a contact with a good to be removed from one of the rows on the shelf will then still allow for an effective removal detection in line with the proposed solution.

In one embodiment, the detection member is mounted to a shelf via at least one fastening element which is inserted in a hole at the shelf.

In another embodiment, the detection member is mounted to the shelf by a portion of the detection member being inserted in a slot at the shelf. For example, the shelf may be provided with an elongated slot at its front portion into which are lower edge of a detection shield is plugged.

In one embodiment, the goods presentation comprises a tampering protection device configured to emit a tampering detection signal if a potential manipulation of the least one sensor element is detected by the tampering protection device. The tampering protection device may be configured to determine if the detection member vibrates for a period of time exceeding a tampering threshold time. The tampering protection device may for example be configured to detect whether a detection signal from the at least one sensor element indicates an ongoing vibrational movement of the detection member exceeding the tampering threshold time. For example, a mechanical impulse on the detection member upon a removal of a good could typically cause a vibration and corresponding detection signal over less than 500 ms, e.g., in the range of 50 ms to 200 ms. In contrast thereto, if a person tries to manipulate the sensor element, e.g., tries to remove the sensor element from the detection member, a vibration of the detection member and a corresponding detection signal for more than one second, two seconds or even three seconds will be caused. A tampering threshold time may thus, for example, be set to one second, two seconds or three seconds.

Generally, the at least one sensor element may be disposed at the detection member, for example at a detection shield. The detection shield may carry the at least one sensor element, and thus for example at least one motion sensor. In one embodiment, the detection member and the sensor element are pre-assembled so that with mounting the detection member the sensor element is also mounted. For example, a detection shield at which the at least one sensor element is already disposed may be mounted to several hooks for hanging goods or mounted to a shelf.

In one embodiment, a sensor unit including the sensor element and a sound emitting element and/or light emitting or display element may be provided. The sensor unit may comprise a housing in which the at least one sensor element is accommodated and which is attached to the detection member. In or at the housing the sound emitting element and/or light emitting or display element is disposed as well. In such an embodiment, an audible tone and/or visible notification in response to a detected contact of a removed good with the detection member may thus directly emitted via the sensor unit. This may, for example, allow for attaching a pre-configured and battery-powered sensor unit to the detection member. The detection member with the sensor unit attached to it may then mounted to two or more hooks or to a shelf of the goods presentation assembly. In such an embodiment, the system is ready for use after mounting the detection member. Further installation steps are not required. A corresponding method for assembling a proposed goods presentation system is thus also proposed here.

A further aspect of the proposed solution relates to a method for detecting a removal of goods arranged in at least two different rows at a goods presentation assembly and being removable one after the other from each row. A detection member is provided at the goods presentation assembly which is contacted upon a removal of at least one good from the first row of the at least two rows and is also contacted upon a removal of at least one good from at least one second row of the at least two rows. The proposed method comprises detecting, via at least one sensor element, a contact with the detection member upon a removal of the good from the goods presentation assembly, and triggering generation of at least one electronic detection signal in response to detecting the contact with the detection member upon the removal of the good from the goods presentation assembly. Accordingly, a single detection member, which is monitored by at least one sensor element, is associated with at least two rows of goods and provides for detecting a removal of goods arranged at least two different rows at a goods presentation assembly. An electronic detection signal is triggered each time a good is removed based on the contact, e.g., of this good or a hand of a consumer grabbing the good, with the detection member irrespective of the row from which the good is removed.

An embodiment of a proposed goods presentation system may in particular implement an embodiment of a proposed method. Accordingly, features and advantages described herein with respect to embodiments of a proposed goods presentation system also apply to embodiments of a proposed method and vice versa.

BRIEF DESCRIPTION OF THE DRAWINGS

The previously mentioned and other advantages of the present solution will be apparent to those skilled in the art upon consideration of the following specification and the attached drawings.

DETAILED DESCRIPTION

Figure 1:
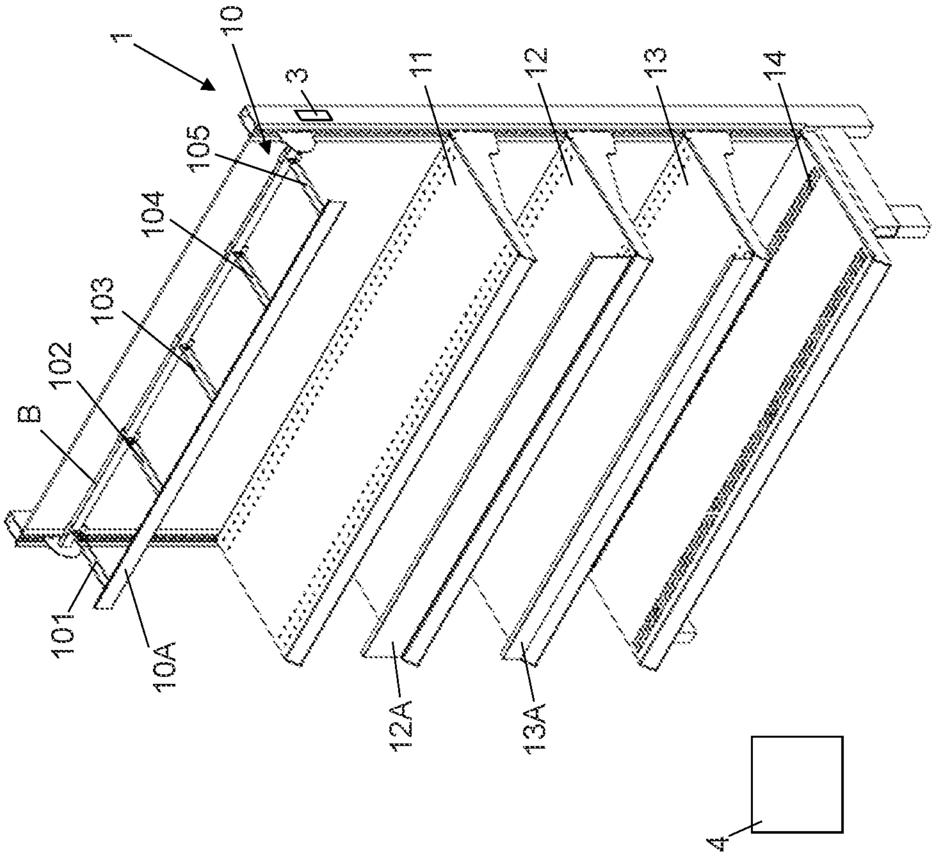
FIG. 1 shows a perspective view of an embodiment of a proposed goods presentation system comprising a display rack with several goods presentation assemblies each including either a shelf or a holder assembly with several hooks.

FIG. 1 shows a goods presentation system including a display rack 1 with 1 back wall onto which different goods presentation assemblies are mounted. At an upper portion of the back wall, a first good presentation assembly in the form of a holder assembly 10 is arranged. The holder assembly 10 includes a carrier cross bar B being fixed due to lateral fixing profiles of the display rack 1. At the carrier cross bar B several (in the present case five) goods holders 101, 102, 103, 104, and 105 with wire hooks are fixed. At these goods holders 101, 102, 103, 104, and 105 goods may be hung to presented to potential buyers. Each goods holder 101 to 105 defines a row for goods at which the goods are arranged one behind the other so that merely a foremost good is to be removed at a front end of a goods holder 101 to 105.

In order to impede removal of a plurality of goods at the same time from one of the goods holders 101 to 105 a detection member in the form of an elongated detection shield 10A is mounted to the plurality of goods holders 101-2105. The detection shield 10A is associated with all goods holders 102 to 105 and mounted to them, as also later described in further detail. For removing a foremost good from one of the goods holders 101 to 105 the single detection shield 10A will be contacted by a consumer's hand and/or the good to be removed so that the detection shield 10A will be excited to at least slightly oscillate and thus vibrate. The detection shield thus provides a mechanical barrier for impeding the removal of goods. Furthermore, a vibration of the detection shield 10A may be electronically detected in order to electronically inform and/or monitor a removal of goods from one or more of the goods holders 101 to 105.

The detection shield 10A also includes a front surface 102A at which price tags for the different goods arranged at the goods holders 101 to 105 may be disposed.

The display rack 1 furthermore includes several (in the example of FIG. 1 four) shelves 11, 12, 13, and 14 below the holder assembly 10. At each one of the shelves 10, 12, 13, and 14 rows of goods—and thus products—may be arranged side-by-side. At front portions of two shelves 12 and 13 elongated detection shields 12A, 13A are fixed for providing a mechanical barrier for impeding a removal of foremost goods in rows of goods from the respective shelf 12 or 13. Each one of the detection shields 12A, 13A is dimensioned and positioned with respect to a shelf 10 or 12 above the shelf 12 or 13 to which the detection shields 12A or 13A is fixed so that a good arranged on shelf 12 or 13 or the hand of consumer grabbing and removing a good has to at least slightly contact an upper portion of the detection shield 12A or 13A when removed. A bottom portion of each detection shield 12A or 13A is fixed to a respective shelf 12 or 13, whereas upper portions upwardly extending from the bottom part are allowed to vibrate and may thus oscillate with respect to the fixed bottom portion.

Figure 2:
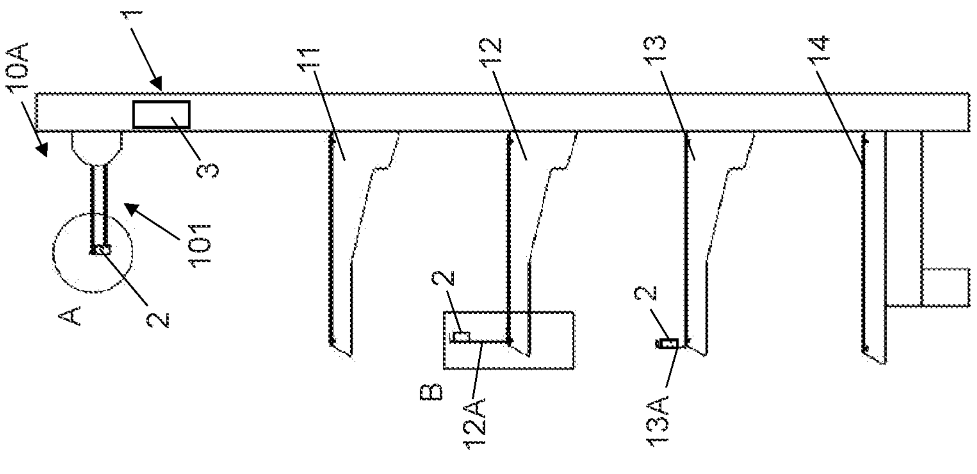
FIG. 2 shows a side view of the display rack of FIG. 1.

As in particular shown in the side view of FIG. 2, each detection shield 10A, 12A and 13A includes at least one sensor unit with a motion sensor 2. This motion sensor 2 is in each case configured to detect a vibration of the detection shield 10A, 12A or 13A to which the respective sensor unit is attached. Each motion sensor 2 is configured to detect a vibration of a detection shield 10A, 12A, or 13A which results from a removal of a good. Thereby, a motion sensor 2 is for example configured to detect a vibration of a downwardly extending (bottom) portion of a detection shield 10A for the goods holders 101 to 105 or is configured to detect a vibration of an upwardly extending (upper) portion for a shelf 12 or 13.

In response to detecting a contact of a good to be removed from the holder assembly 10 or one of the shelves 12 or 13, the respective motion sensor 2 triggers generation of an electronic detection signal which results in emitting an audible tone via a sound emitting device of the sensor unit disposed at the respective detection shield 10A, 12A or 13A. Accordingly, if one good is removed from one of goods holder assembly including the goods holders 101 to 105 or a shelf 12 or 13, the good contacts a detection shield 10A, 12A or 13A and triggers an audible tone. Other customers or staff at the point of sale are thus made aware of a removal of the good from the display rack 1.

In one embodiment, each sensor unit with a motion sensor 2 may include at least one microprocessor by means of which the sensor unit is further configured to generate an alarm signal in response to a number of detection signals occurring within a predetermined period of time exceeding a threshold value. The sensor unit may thus be configured to detect an atypical removal frequency which may speak for a theft attempt in which a plurality of the goods is removed at the same time or within a short period of time.

An alarm device 3 may be provided at the display rack 1 to which several sensor units with its motion sensors 2 are connected wirelessly or via wired connections. The alarm device 3 may receive alarm signals from the sensor units. In another embodiment, the alarm device 3 just receives detection signals from the different sensor units comprises a sound emitting device and/or a visual indicator to inform about the generation of an detection signal. In still another embodiment, the alarm device 3, via at least one microphone, acoustically captures audible tones emitted by the sensor units upon a removal of a good. The alarm device 3 may then be configured to evaluate the number of emitted detection signals or audible tones within a predetermined period of time in order to generate the alarm signal in the case of an atypical removal frequency.

In one embodiment, the alarm device 3 or one or more of the sensor units may be coupled (wirelessly or via wired connection) to a surveillance system 4. The surveillance system 4 may comprise at least one camera to capture images of the display rack 1 in response to receipt of the alarm signal. In one embodiment, the surveillance system 4 comprises at least one robot to be controlled to move to the display rack 1 in response to receipt of the alarm signal.

Figure 3B:
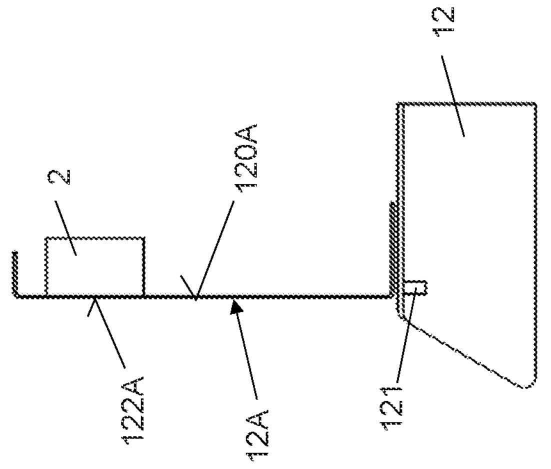
FIG. 3B shows an enlarged view of a detail B depicted in FIG. 2.
Figure 3A:
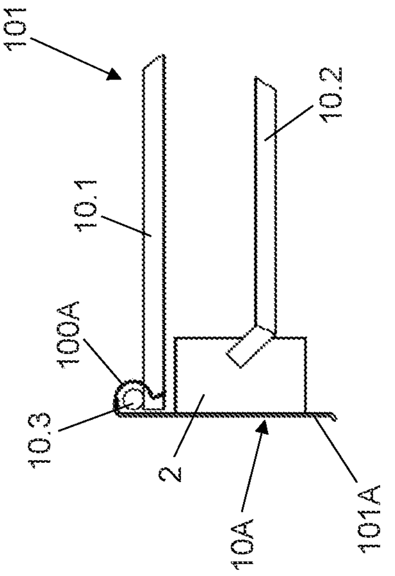
FIG. 3A shows an enlarged view of a detail A depicted in FIG. 2.

FIG. 3 shows an enlarged side view of detail a of FIG. 2. FIG. 3 shows a front portion of one of the goods holders 101 to 105. The goods holder 101 shown in FIG. 3 (like the other goods holder 101 to 105) comprises a holding wire/holding rod 10.2 at which the goods may be slidably arranged. Above the holding wire/holding rod 10.2 a top wire/top rod 10.1 extends in parallel. At a front end of the top wire/top rod 10.1 a transversely extending stud 10.3 exists.

Onto the stud 10.3 the detection shield 10A is clipped a fastening clip 100A of the detection shield 10A. Via the fastening clip 100A the detection shield 10A may be easily mounted onto the top wire/top rod 10.1. When sliding a foremost good to a front end of the holding wire/holding rod 10.2 the respective good must contact a downwardly extending portion of the detection shield 10A so that it at least slightly starts oscillating/vibrating 3. A corresponding oscillation/vibration may then be sensed by the motion sensor 2 disposed at an inner side of the detection shield 10A.

Figure 4:
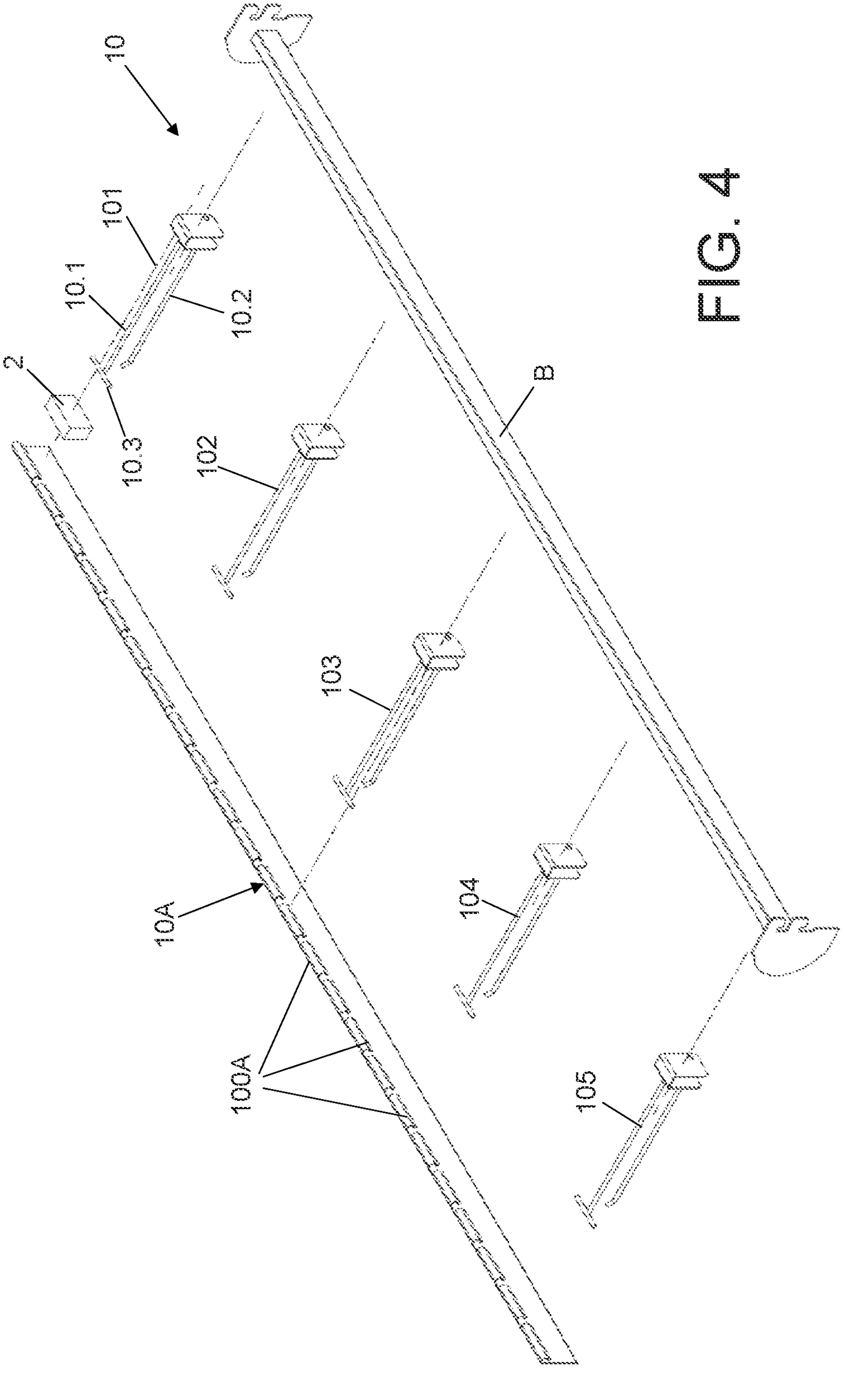
FIG. 4 shows an exploded view of the holder assembly with five hooks fixed to a carrier cross bar, wherein in a single detection member with an elongated detection shield is associated with and fixed to each one of the five hooks.

As shown in the exploded view of FIG. 4, the detection shield 10A comprises several, equally spaced fastening clips 100A for clipping the detection shield 10A onto each one of the goods holders 101 to 105. The studs 10.3 of the different goods holders 101 to 105 thus define a common axis for the detection shield 10A. By a single sensor unit with a motion sensor 2 at an inner side of detection shield 10A all goods holders 101 to 105 may thus be the electronically monitored for a removal of goods based in a vibration of the detection shield 10A, while installation of the detection shield 10A at the holder assembly 10 via the fastening clips 100A is quick and simple. Since the sensor unit is also provided with a sound emitting device and/or a visual indicator, such as a light emitting element or display element, the whole system is quickly installed ready to use. In one embodiment, the sensor unit already disposed at the detection shield 10A before mounting the detection shield 10A.

Figure 5B:
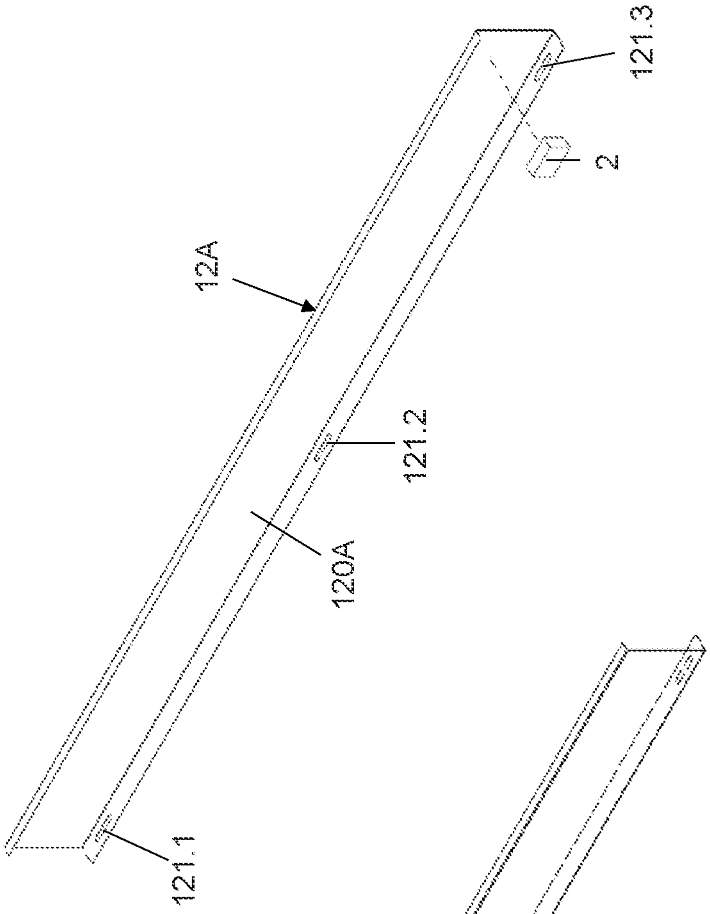
FIG. 5B shows a perspective rear view of the detection shield of FIG. 5A.
Figure 5A:
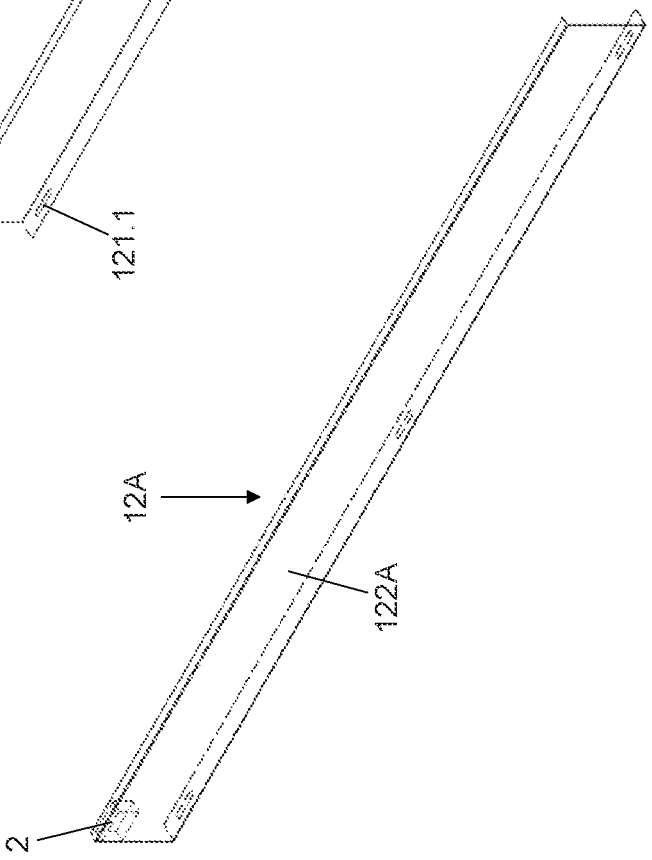
FIG. 5A shows a perspective front view of an elongated detection shield for one of the shelves of the display rack.

As exemplary shown for shelf 12 and its detection shield 12A in FIG. 3B and in the perspective views of FIGS. 5A and 5B, a detection shield 12A (like detection shield 13A) is also easy to install and use.

The exemplarily shown detection shield 12A includes a front surface 122A facing a customer. At the front surface 122A price tags may be arranged. At an opposite inner surface 120A the sensor unit with its motion sensor 2 is disposed.

An upper edge of the detection shield 12A may be inwardly bent, for example about 90° or less. The inwardly bent upper edge may make it more likely that a good to be removed from a shelf 12 to which the detection shield 12A is attached contacts the detection shield 12A and causes at least a vibration of the detection shield 12Aa which is sensed by the motion sensor 2 for generating a detection signal.

In the embodiment shown in FIGS. 1 and 2 the shelf 12 includes several fastening holes at a front portion. At one or more of this fastening holes of the shelf 12, the detection shield 12A is fixed via fastening pins, bolts, or screws 121.

A fastening pin, bolt, or screw 121 extends through a hole 121.1, 121.2, or 121.3 provided at an inwardly extending fastening strip of the detection shield 12A.

In another embodiment, fastening pins 121 may be integrally formed at a bottom part of the detection shield 12A. These fastening pins 121 may then protrude from the bottom part of the detection shield 12A and may be plugged into the fastening holes at the front portion of a shelf 12.

Figure 6:
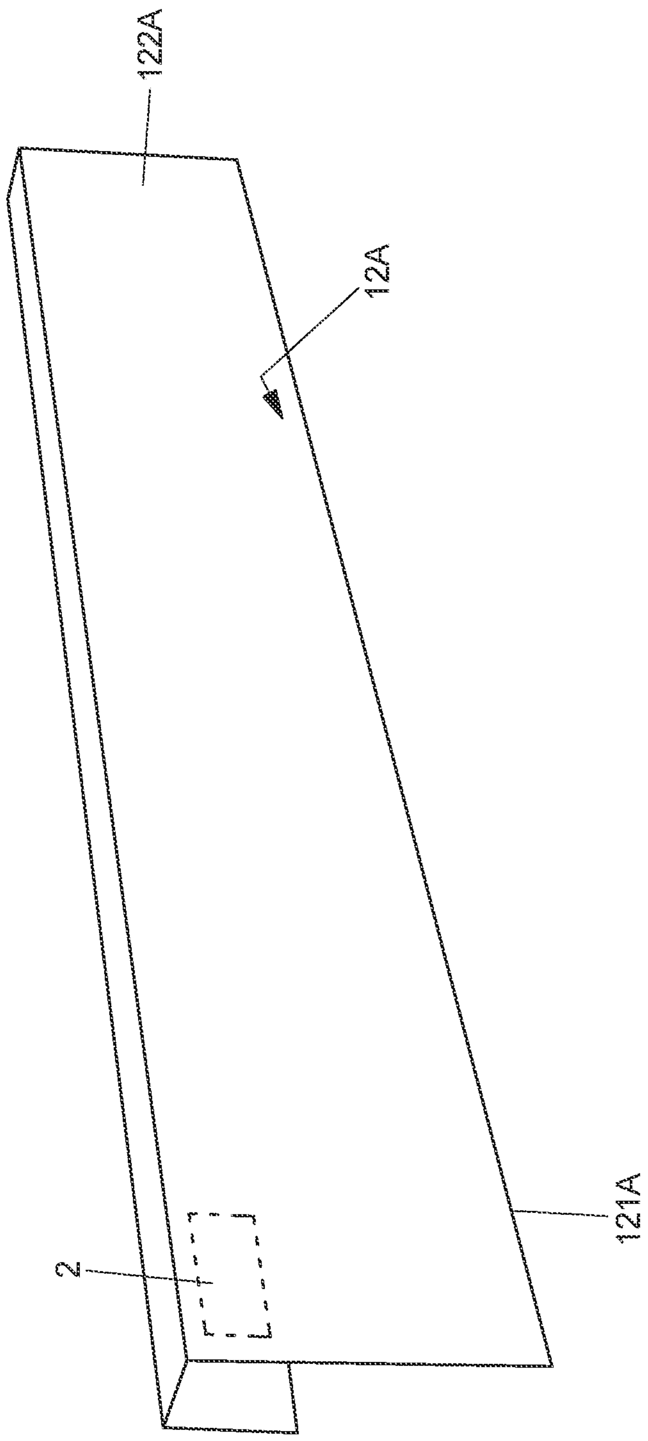
FIG. 6 shows a perspective front view of another embodiment of an elongated detection shield which may be plugged onto a slot at a front portion of a shelf.

In another embodiment, illustrated by FIG. 6, a detection shield 12A for a shelf 12 (or 13) includes a straight fastening bottom edge 121A. This fastening bottom edge 121A may then be plugged into an elongated slot provided at a front portion of the shelf.

FIG. 6 further illustrates that an inwardly bent upper edge of the detection shield 12A may also be bent more than once in order to increase the likelihood of a contact with a good upon the good's removal from the shelf.

In one embodiment, a sensor unit with a motion sensor 2 and/or the alarm device 3 further includes a tampering protection device configured to emit a tampering detection signal if a potential manipulation of a motion sensor 2 is electronically detected. It may, for example, be detected whether a detection signal from a motion sensor indicates an ongoing vibrational movement of a detection shield 10A, 12A or 13A exceeding a tampering threshold time. For example, a mechanical impulse on a detection shield 10A, 12A, 13A upon a removal of a good could typically cause a vibration and corresponding detection signal over less than 500 ms, e.g., in the range of 50 to 200 ms. In contrast thereto, if a person tries to manipulate a motion sensor 2, e.g., tries to remove the motion sensor 2 or the whole sensor unit from the respective detection shield 10A, 12A, 13A, a vibration of the detection shield 10A, 12A, 13A and a corresponding detection signal for more than one second, two seconds or even three seconds will occur. A tampering threshold time may thus, for example, be set to one second, two seconds or three seconds. Emission of a tampering alarm may thus be triggered in case a continued vibration of a detection shield 10A, 12A 13A is detected for more than one second, two seconds or three seconds.

The foregoing description of the embodiments has been provided for purposes of illustration and description. It is not intended to limit the disclosure. Individual elements or features of a particular embodiment are generally not limited to that particular embodiment, but, where applicable, are interchangeable and can be implemented in another embodiment, even if not specifically shown or described. The same elements may also be varied in one or more ways. Such variations are not to be regarded as a departure from the disclosure, and all such modifications are intended to be included within the scope of the disclosure.

The invention claimed is:

1. A goods presentation system, comprising:

at least one goods presentation assembly defining at least two rows for presenting goods, wherein goods are to be removed one after another from each row;

a detection member for the at least one goods presentation assembly configured to be contacted upon a removal of at least one good from a first row of the least two rows and to be also contacted upon a removal of at least one good from at least one second row of the least two rows; and at least one sensor element associated with the detection member and configured to trigger generation of at least one electronic detection signal upon the detection member being contacted when a good is removed from one of the first and second rows, the at least one sensor element comprising a motion sensor for detecting a vibration of the detection member resulting from a contact with the detection member and for triggering generation of the at least one electronic detection signal based on a detected vibration.

2. The goods presentation system of claim 1, wherein the at least one electronic detection signal triggers output of at least one of an audible tone and a visual notification at the goods presentation system.

3. The goods presentation system of claim 1, further comprising an alarm device configured to receive the at least one electronic detection signal and to detect occurrence of a number of electronic detection signals during a given period of time exceeding a threshold value.

4. The goods presentation system of claim 3, wherein the threshold value is 3 detection signals in 5 seconds, 5 detection signals in 20 seconds, 7 detection signals in 30 seconds or 10 detection signals in 45 seconds.

5. The goods presentation system of claim 3, wherein the alarm device is configured to generate an alarm signal if a number of electronic detection signals during the given period of time exceeds the threshold value.

6. The goods presentation system of claim 3, wherein the alarm device is configured to transmit the alarm signal to a mobile device and/or to a surveillance system connected to the goods presentation system.

7. The goods presentation system of claim 6, wherein the surveillance system comprises at least one camera to capture images of the goods presentation assembly in response to receipt of the alarm signal and/or the surveillance system comprises at least one robot to be controlled to move to the goods presentation assembly in response to receipt of the alarm signal.

8. The goods presentation system of claim 6, wherein the surveillance system is configured to output at least one of an audible tone and a visual notification at a display device of the surveillance system and/or to transmit an alarm to a mobile device.

9. The goods presentation system of claim 1, wherein the detection member comprises a detection shield mounted at a front side of the at least two rows.

10. The goods presentation system of claim 1, wherein at least a portion of the detection member is configured to vibrate upon being contacted when a good is removed from the first row and when a good is removed from the at least one second row.

11. The goods presentation system of claim 10, wherein the detection member is mounted to a first mounting part associated with the first row and to at least one second mounting part associated with the at least one second row.

12. The goods presentation system of claim 1, wherein the goods presentation assembly comprises a first hook for the first row and a second hook for the second row.

13. The goods presentation system of claim 12, wherein the detection member is clipped on both the first hook and the second hook.

14. The goods presentation system of claim 1, wherein the goods presentation assembly comprises a shelf at which the first row of goods and the least one second row of goods are to be arranged.

15. The goods presentation system of claim 14, wherein the shelf includes at least two compartments each compartment defining one of the at least two rows for the goods to be presented and arranged at the goods presentation assembly.

16. The goods presentation system of claim 14, wherein the detection member is mounted to the shelf via at least one fastening element inserted in a hole of the shelf or the detection member is mounted to the shelf by a portion of the detection member being inserted in slot of the shelf.

17. The goods presentation system of claim 1, comprising a tampering protection device configured to emit a tampering detection signal if a potential manipulation of the least one sensor element is detected by the tampering protection device.

18. The goods presentation system of claim 17, wherein the tampering protection device is configured to determine if the detection member vibrates for a period of time exceeding a tampering threshold time.

19. A method for detecting removal of goods arranged in at least two rows at goods presentation assembly and being removable one after another from each row, wherein a detection member is provided which is contacted upon a removal of at least one good from a first row of the least two rows and is also contacted upon a removal of at least one good from at least one second row of the least two rows, the method comprising:

detecting, via at least one sensor element, a contact with the detection member upon a removal of the good from the goods presentation assembly; and triggering generation of at least one electronic detection signal in response to detecting the contact with the detection member upon the removal of the good from the goods presentation assembly, wherein the at least one sensor element comprises a motion sensor, via which a vibration of the detection member resulting from the contact with the detection member is detected and via which, based on the detected vibration, the generation of the at least one electronic detection signal is triggered.

* * * * *